(12) United States Patent
Valenzuela

(10) Patent No.: US 9,341,414 B1
(45) Date of Patent: May 17, 2016

(54) SWAMP COOLER ASSEMBLY

(71) Applicant: Francisco Valenzuela, Tucson, AZ (US)

(72) Inventor: Francisco Valenzuela, Tucson, AZ (US)

( * ) Notice: Subject to any disclaimer, the term of this patent is extended or adjusted under 35 U.S.C. 154(b) by 315 days.

(21) Appl. No.: 14/014,720

(22) Filed: Aug. 30, 2013

(51) Int. Cl.
*F28D 5/00* (2006.01)
*F28C 3/08* (2006.01)

(52) U.S. Cl.
CPC ........................................ *F28C 3/08* (2013.01)

(58) Field of Classification Search
CPC .............................. F24F 5/0035; Y02B 30/545
USPC .................................. 62/259.4, 310, 314, 315
See application file for complete search history.

(56) References Cited

U.S. PATENT DOCUMENTS

| 4,033,740 | A | * | 7/1977 | Meckler | A62C 3/00 169/19 |
|---|---|---|---|---|---|
| 4,261,930 | A | | 4/1981 | Walker | |
| 4,369,148 | A | | 1/1983 | Hawkins | |
| D299,720 | S | | 2/1989 | Yoo | |
| 5,383,337 | A | | 1/1995 | Baker | |
| 6,213,200 | B1 | * | 4/2001 | Carter | F28C 1/14 165/110 |
| 6,418,728 | B1 | | 7/2002 | Monroe | |
| 6,511,049 | B2 | | 1/2003 | Colussi et al. | |
| D627,427 | S | | 11/2010 | Joensson | |
| 2009/0090488 | A1 | * | 4/2009 | McCann | F24F 5/0035 165/104.31 |
| 2012/0117987 | A1 | * | 5/2012 | Claridge | F24F 5/0035 62/94 |
| 2012/0118147 | A1 | * | 5/2012 | Claridge | B01D 53/268 95/52 |

* cited by examiner

Primary Examiner — Melvin Jones

(57) ABSTRACT

An evaporative cooler assembly utilizes available water runoff and a filtration mechanism to increase efficiency and maintain an existing evaporative cooler. The assembly includes a main housing and a first intake vent coupled to and extending through the main housing. A first evaporative pad positioned in the main housing adjacent to the first intake vent. A blower is positioned in the main housing for urging the ambient air through the intake vent and out of an output duct. A reservoir is provided extrinsic to the main housing. A delivery line is in fluid communication between the reservoir and the evaporative pad. A pump is operationally coupled to the delivery line urging water through the delivery line. A return line is coupled to the main housing and the reservoir wherein, the return line returns unevaporated fluid to the reservoir.

11 Claims, 3 Drawing Sheets

SWAMP COOLER ASSEMBLY

BACKGROUND OF THE DISCLOSURE

Field of the Disclosure

The disclosure relates to cooling devices and more particularly pertains to a new cooling device for utilizing available water runoff and a filtration mechanism to increase efficiency and maintain an existing evaporative cooler.

SUMMARY OF THE DISCLOSURE

An embodiment of the disclosure meets the needs presented above by generally comprising a main housing and a first intake vent coupled to and extending through the main housing. A first evaporative pad positioned in the main housing adjacent to the first intake vent. A blower is positioned in the main housing for urging the ambient air through the intake vent and out of an output duct. A reservoir is provided extrinsic to the main housing. A delivery line is in fluid communication between the reservoir and the evaporative pad. A pump is operationally coupled to the delivery line urging water through the delivery line. A return line is coupled to the main housing and the reservoir wherein the return line returns unevaporated fluid to the reservoir.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
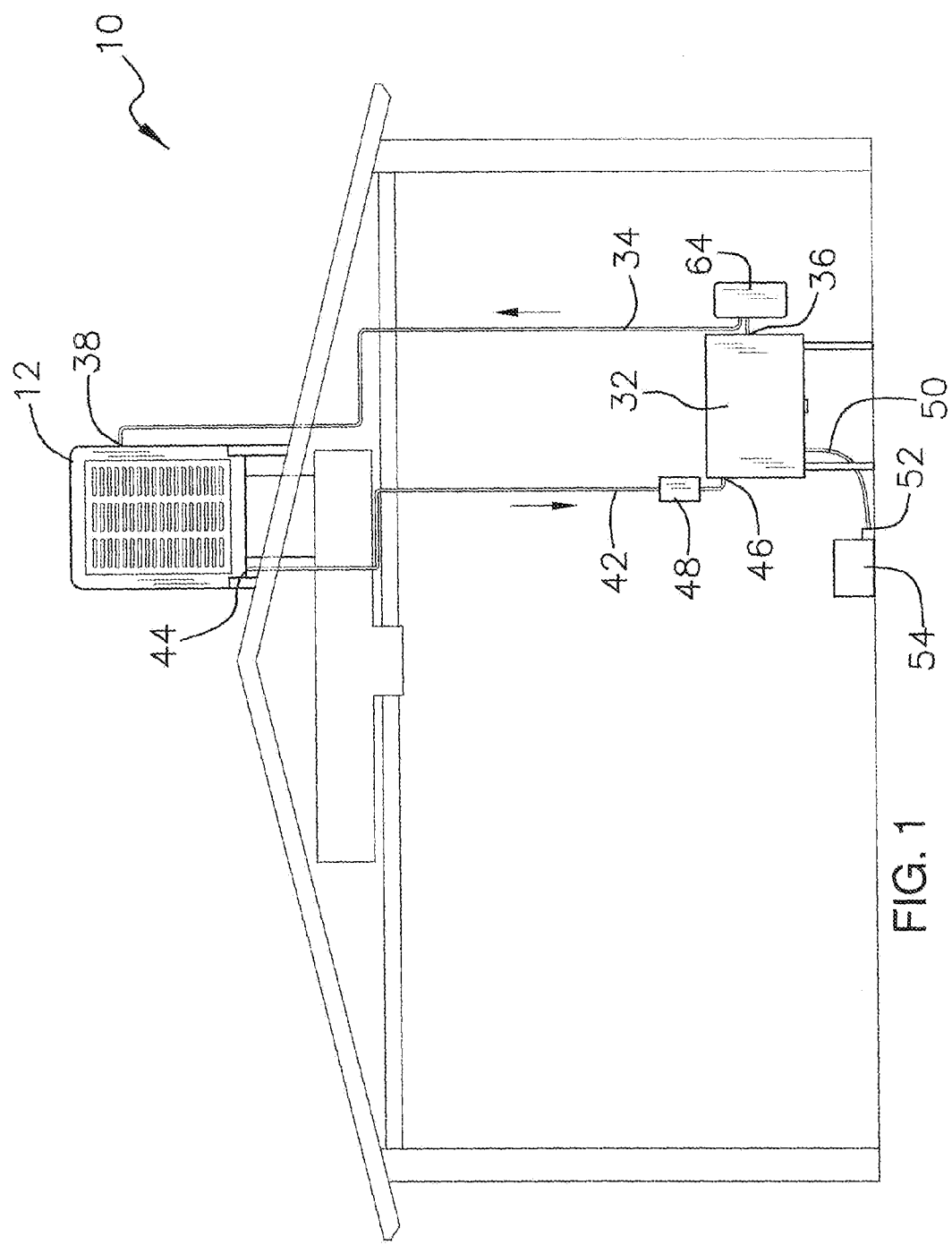
FIG. 1 is a front view of a evaporative cooler assembly according to an embodiment of the disclosure.
Figure 3:
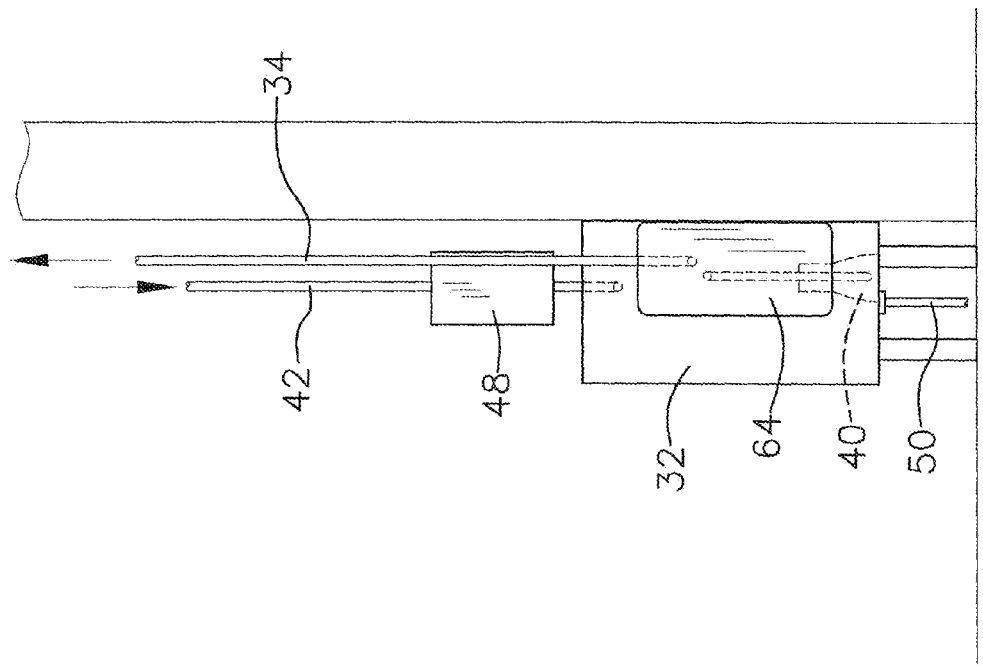
FIG. 3 is a side view of an embodiment of the disclosure.
Figure 2:
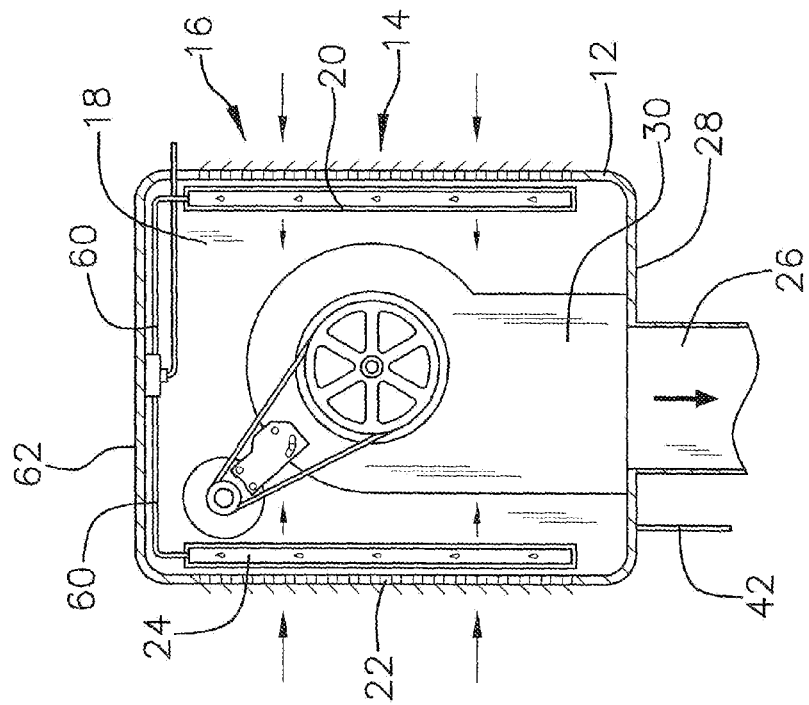
FIG. 2 is a cut-away front view of an embodiment of the disclosure.
Figure 4:
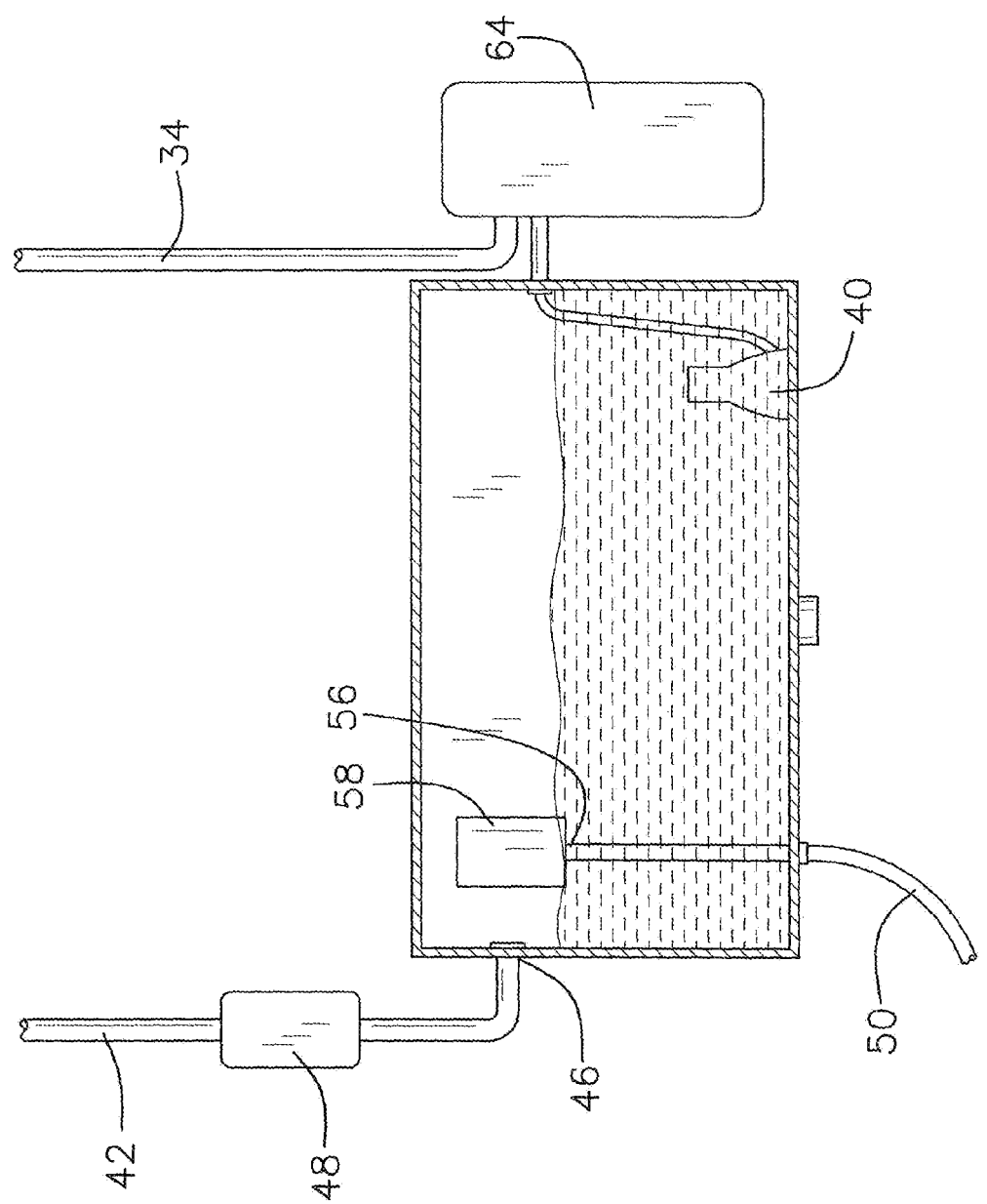
FIG. 4 is a cut-away front view of an embodiment of the disclosure.

With reference now to the drawings, and in particular to FIGS. 1 through 4 thereof, a new cooling device embodying the principles and concepts of an embodiment of the disclosure and generally designated by the reference numeral 10 will be described.

As best illustrated in FIGS. 1 through 4, the evaporative cooler assembly 10 generally comprises a main housing 12 and a first intake vent 14 coupled to and extending through the main housing 12. The first intake vent 14 is configured for passing ambient air into the main housing 12. The first intake vent 14 extends through a first side 16 of a perimeter wall 18 of the main housing 12. A first evaporative pad 20 is positioned in the main housing 12 adjacent to the first intake vent 14. A second intake vent 22 may be positioned in the main housing 12. The second intake vent 22 may be oppositionally positioned relative to the first intake vent 14. A second evaporative pad 24 is coupled to and positioned in the main housing 12 adjacent to the second intake vent 22 in spaced relationship to the first evaporative pad 20. An output duct 26 is coupled to and extends through the main housing 12. The output duct 26 is configured for expelling cooled air from the main housing 12. The output duct 26 may extend through a bottom wall 28 of the main housing 12. A blower 30 may be positioned in the main housing 12, The blower 30 is configured for urging the ambient air through the first intake vent 14 and the second intake vent 22 and out of the output duct 26. The blower 30 may be positioned between the first evaporative pad 20 and the second evaporative pad 24.

A reservoir 32 is provided extrinsic to the main housing 12 such that the main housing 12 and the reservoir 32 may be positioned in different positions as may be desirable. A delivery line 34 has a first end 36 in fluid communication with the reservoir 32 and a second end 38 in fluid communication with the first evaporative pad 20 and the second evaporative pad 24. A pump 40 is operationally coupled to the delivery line 34. The pump 40 urges water through the delivery line 32 from the first end 36 to the second end 38, A return line 42 has a first end 44 coupled to the main housing 12. The return line 42 has a second end 46 in fluid communication with the reservoir 32 wherein the return line 42 is configured to return unevaporated fluid to the reservoir 32. A filter 48 may be coupled to the return line 42.

A supply line 50 may be provided having a first end 52 in fluid communication with a water source 54. The supply line 50 has a second end 56 in fluid communication with the reservoir 32 wherein the supply line 50 is configured for supplying water to the reservoir 32 as needed. The water source 54 may be a water line, a collector of rainwater, or the like. A level indicator 58 of conventional fashion may be positioned in the reservoir 32 and operationally coupled to a valve to selectively supply fluid to the reservoir 32 as needed.

A pair of distribution lines 60 may be provided. Each distribution line 60 is in fluid communication with the delivery line 34 and an associated one of the first evaporative pad 20 and the second evaporative pad 24. The delivery line 32 may extend into the main housing proximate a top wall 62 of the main housing 12. The delivery line 34 is in fluid communication with the distribution lines 60. An auxiliary cool water tank 64 may also be coupled to the delivery line 34 between the first end 36 of the delivery line 34 and the second end 38 of the delivery line 34.

In use, water is provided to each of the first evaporative pad 20 and the second evaporative pad 24 to cool ambient air drawn through the first intake vent 14 and the second intake vent 22. The blower 30 further urges the cooled air through the output duct 26 where it may be directed into desired areas of a dwelling or other structure. The reservoir 32 is positioned separate from the main housing 12 allowing for collection of water in the reservoir and easier maintenance of the reservoir 32 and all other parts not positioned in an elevated position on a structure.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An evaporative cooler assembly comprising:
a main housing;
a first intake vent coupled to and extending through said main housing, said first intake vent being configured for passing ambient air into said main housing;
a first evaporative pad positioned in said main housing adjacent to said first intake vent;
an output duct coupled to and extending through said main housing, said output duct being configured for expelling cooled air from said main housing;
a blower positioned in said main housing, said blower being configured for urging the ambient air through the intake vent and out of the output duct;
a reservoir extrinsic to said main housing;
a delivery line having a first end in fluid communication with said reservoir and a second end in fluid communication with a first evaporative pad;
a pump operationally coupled to a supply line, said pump urging water through said delivery line from said first end to said second end; and
a return line having a first end coupled to said main housing, said return line having a second end in fluid communication with said reservoir wherein said return line is configured to return unevaporated fluid to said reservoir.

2. The assembly of claim 1, further comprising a filter coupled to said return line.

3. The assembly of claim 1, further comprising a supply line having a first end in fluid communication with a water source, said supply line having a second end in fluid communication with said reservoir wherein said supply line is configured for supplying water to said reservoir.

4. The assembly of claim 1, further comprising a level indicator positioned in said reservoir.

5. The assembly of claim 1, further comprising said output duct extending through a bottom wall of said main housing.

6. The assembly of claim 1, further comprising said first intake vent extending through a first side of a perimeter wall of said main housing.

7. The assembly of claim 6, further comprising:
a second intake vent being positioned in said main housing, said second intake vent being oppositionally positioned relative to said first intake vent; and
a second evaporative pad coupled to and positioned in said main housing, said second evaporative pad being positioned adjacent to said second intake vent in spaced relationship to said first evaporative pad.

8. The assembly of claim 1, further comprising said blower being positioned between said first evaporative pad and said second evaporative pad.

9. The assembly of claim 1, further comprising:
a pair of distribution lines, each distribution line being in fluid communication with said delivery line and an associated one of said first evaporative pad and a second evaporative pad; and
said delivery line extending into said main housing proximate a top wall of said main housing, said delivery line being in fluid communication with said distribution lines.

10. The assembly of claim 1, further comprising an auxiliary cool water tank being coupled to said delivery line between said first end of said delivery line and said second end of said delivery line.

11. An evaporative cooler assembly comprising:
a main housing;
a first intake vent coupled to and extending through said main housing, said first intake vent being configured for passing ambient air into said main housing, said first intake vent extending through a first side of a perimeter wall of said main housing;
a first evaporative pad positioned in said main housing adjacent to said first intake vent;
a second intake vent being positioned in said main housing, said second intake vent being oppositionally positioned relative to said first intake vent;
a second evaporative pad coupled to and positioned in said main housing, said second evaporative pad being positioned adjacent to said second intake vent in spaced relationship to said first evaporative pad;
an output duct coupled to and extending through said main housing, said output duct being configured for expelling cooled air from said main housing, said output duct extending through a bottom wall of said main housing;
a blower positioned in said main housing, said blower being configured for urging the ambient air through the intake vent and out of the output duct, said blower being positioned between said first evaporative pad and said second evaporative pad;
a reservoir extrinsic to said main housing;
a delivery line having a first end in fluid communication with said reservoir and a second end in fluid communication with said evaporative pad;
a pump operationally coupled to a supply line, said pump urging water through said delivery line from said first end to said second end;
a return line having a first end coupled to said main housing, said return line having a second end in fluid communication with said reservoir wherein said return line is configured to return unevaporated fluid to said reservoir;
a filter coupled to said return line;
a supply line having a first end in fluid communication with a water source, said supply line having a second end in fluid communication with said reservoir wherein said supply line is configured for supplying water to said reservoir;
a level indicator positioned in said reservoir;
a pair of distribution lines, each distribution line being in fluid communication with said delivery line and an associated one of said first evaporative pad and said second evaporative pad, said delivery line extending into said main housing proximate a top wall of said main housing, said delivery line being in fluid communication with said distribution lines; and an auxiliary cool water tank being coupled to said delivery line between said first end of said delivery line and said second end of said delivery line.

\* \* \* \* \*